United States Patent Office 3,408,222
Patented Oct. 29, 1968

3,408,222
GLASS-SILICON ASSEMBLIES
Louis Navias, Schenectady, N.Y., assignor to General Electric Company, a corporation of New York
No Drawing. Filed Aug. 23, 1965, Ser. No. 481,977
4 Claims. (Cl. 117—70)

This invention relates to new glass-silicon seals which are both bubble-free and substantially strain-free.

There are usually two problems to be faced when a silicon part is to be incorporated in an apparatus as an element of an integrated or composite structure, e.g., as a window in a piece of electronic gear or as a sensitive element on a supporting substrate of glass, metal or other material. In the first place, there is the tendency of the silicon to react in some imperfectly understood manner with the material to which it is to be joined, or with the cement or adhesive which is to be used to effect the joining. Secondly, there is a substantial thermal expansion coefficient differential between the silicon and the material to which the silicon is to be joined in a permanent vapor-tight seal.

In the range of 25° C. to 300° C., polycrystalline silicon has a linear thermal expansion of $2.8 \times 10^{-6}$ centimeters per centimeter per degree centigrade, while a single crystal of silicon has a linear thermal expansion of $3.1 \times 10^{-6}$ cm. per cm. per degree centigrade. Over this same temperature range, some common glasses, such as soda-lime glasses and borosilicate glasses, have coefficients several times these values.

A silicon window set in a glass apparatus ideally will require a glass having a thermal expansion over the anticipated temperature range of use slightly smaller than that of the silicon body. In that way, straining of the seal between the glass and silicon parts can be avoided under operating conditions. However, many glasses having thermal expansion coefficients approximating those of silicon when applied to a silicon rod, e.g., as a melt, form an interface of many tiny bubbles similar to a froth. Cleaning and etching of the silicon have no influence on the bubbling of these hot glasses, there apparently being a chemical reaction of some kind between the silicon and one or more of the oxides present in such glasses. In any event, the presence of such bubbles together with the strain which develops in composites of this type, makes them unsuitable for most purposes.

I have discovered, quite unpredictably, that the dilemma of having to choose between a bubble-containing but strain-free glass-silicon seal structure and one which is bubble-free but has somewhat less strain, can be avoided. Thus, I have found that bubble-free and strain-free glass-silicon seals can consistently and easily be produced through the use of glasses previously known and used in the art although in different ways and for different purposes. My present invention is predicated on this discovery and has both article and method aspects involving as an essential novel feature the use of either of two particular glasses as a thin intermediate layer between a silicon body and a relatively heavy layer of a glass of the Pyrex glass type.

Briefly described, an article or assembly of this invention comprises a silicon element or member united or joined or bonded to a relatively thick or massive body of a glass approximately matching the thermal expansion of silicon by means of a relatively thin layer of a glass which in the molten state does not react with silicon to produce bubbles and which has a coefficient of thermal expansion between 25° C. and 300° C. of between $2.4 \times 10^{-6}$ and $3.6 \times 10^{-6}$ cm. per cm. per degree centigrade.

In its method aspect, this invention, generally stated, includes the steps of applying a coating of a non-reactive borosilicate glass to a surface portion of a silicon body, and then applying a coating of a silicon-matching glass to a solidified surface portion of the non-reactive glass on the silicon body. Preferably, for most purposes, the non-reactive glass coating will be as thin as possible and the silicon-matching glass coating will be substantially thicker or heavier.

In carrying out this process, I have employed glasses of the following compositions (in terms of weight percentages):

|  | $SiO_2$ | $B_2O_3$ | $PbO$ | $Al_2O_3$ | $Na_2O+K_2O+Li_2O$ |
|---|---|---|---|---|---|
| Corning Nonex Glass 7720 | 73 | 16½ | 6½ |  | 4 |
| General Electric GSC4 Glass | 80 | 18½ |  | ½ | 1 |
| Pyrex Glass 7740 | 81 | 12½ |  | 2 | 4½ |

In using these glasses, I first coat a clean silicon article, such as a rod or a wafer, with a thin film of glass. This may be done by applying a thin section of non-reactive glass to the silicon article and firing the article in air to melt the glass and then cooling the article and freezing in place the resulting sleeve-like glass coating or envelope. The second or silicon-matching glass layer is then applied by means of a heavier section of glass, another firing like the first being carried out although a different firing temperature may be necessary or desirable. The resulting article has typically an outer glass coating of thickness approximating one-quarter inch, while the inner or sealing glass coating is about 10 mils thick, and both coatings are preferably substantially uniform in thickness independently of the outer contour or shape of the silicon substrate body.

The Corning Nonex Glass or the General Electric GSC4 Glass is the nonreactive glass in this combination, while the Pyrex Glass 7740 is the silicon-matching glass. The said Nonex Glass has a coefficient of linear thermal expansion of $3.6 \times 10^{-6}$ cm. per cm. per degree centigrade over the range 25° C. to 300° C. The GSC4 Glass, however, has a linear thermal expansion of $2.4 \times 10^{-6}$ cm. per cm. per degree centigrade over the same temperature range. In contrast, again, the Pyrex 7740 Glass has a linear thermal expansion of $3.2 \times 10^{-6}$ cm. per cm. per degree centigrade.

The silicon elements or articles used in such operations are suitably prepared by cleaning with chromic acid or, alternatively, are given an etch polish by dipping in a cold solution of one part hydrofluoric acid and three parts nitric acid. However, any procedure resulting in the removal of dirt which would interfere with the silicon-glass bond formation may be used.

In general, the greater the thickness of the intermediate glass layer, the greater will be the strain in thermal cycling. Consequently, in accordance with this invention, the layer of nonreactive glass will be as thin as practicable regardless of the thickness or bulk of the silicon body or the silicon-matching glass layer and, in any event, will be not more than 20 to 30 mils thick.

The present invention appears to have particular utility in achieving a seal between glass and silicon, e.g., wherein the glass may serve as a protective coating for a silicon device, for example, as a housing material for a fragile miniature silicon wafer utilized as a semiconductor in an electronic apparatus, but it would appear to be equally useful in the mounting of a silicon window in a glass envelope.

What I claim as new and desire to secure by Letters Patent of the United States is:

1. A vapor-tight, bubble-free, substantially strain-free glass-silicon assembly consisting of a silicon member united to a body of glass approximately matching the thermal expansion of silicon by means of a relatively thin layer of a glass which in the molten state does not react with silicon to produce bubbles and which has a coefficient of thermal expansion between 25° C. and 300° C. of between $2.4 \times 10^{-6}$ and $3.6 \times 10^{-6}$ cm. per cm. per degree centigrade.

2. The assembly as described in claim 1 in which the relatively thin layer of glass consists essentially of a borosilicate glass consisting of 80 percent silica, 18.5 percent boron oxide, one-half percent alumina and an aggregate of one percent of sodium oxide, potassium oxide and lithium oxide.

3. The assembly as described in claim 1 in which the relatively thin layer of glass consists essentially of a borosilicate glass consisting of 73 percent silica, 16.5 percent boron oxide, 6.5 percent lead oxide and an aggregate of four percent of sodium oxide, potassium oxide and lithium oxide.

4. The assembly as described in claim 1 in which the glass of the glass body consists essentially of 81 percent silica, 12.5 percent boron oxide, two percent alumina and an aggregate of 4.5 of alkali metal oxides.

References Cited

UNITED STATES PATENTS

| | | | |
|---|---|---|---|
| 3,050,409 | 8/1962 | Bayer | 117—23 |
| 3,158,505 | 11/1964 | Sandor | 117—215 |
| 3,200,310 | 8/1965 | Carman | 117—125 |

ROBERT F. BURNETT, Primary Examiner.

W. J. VAN BALEN, Assistant Examiner.